(12) United States Patent
Senges et al.

(10) Patent No.: US 8,371,654 B2
(45) Date of Patent: Feb. 12, 2013

(54) ARMREST SUPPORT FOR A MOTOR VEHICLE SEAT

(75) Inventors: Thierry Senges, Saint Cheron (FR); Emmanuel Cardon, La Ferte Alais (FR); Alain Vissiere, Saint Georges D'Orques (FR)

(73) Assignee: Faurecia Sieges d'Automobile, Nanterre (FR)

( * ) Notice: Subject to any disclaimer, the term of this patent is extended or adjusted under 35 U.S.C. 154(b) by 301 days.

(21) Appl. No.: 12/708,939

(22) Filed: Feb. 19, 2010

(65) Prior Publication Data

US 2010/0207441 A1  Aug. 19, 2010

(30) Foreign Application Priority Data

Feb. 19, 2009  (FR) ...................... 09/51075

(51) Int. Cl.
*A47C 7/54* (2006.01)
(52) U.S. Cl. .............. 297/411.32; 297/411.46
(58) Field of Classification Search ............. 297/411.26, 297/411.29, 411.32, 411.34, 411.46
See application file for complete search history.

(56) References Cited

U.S. PATENT DOCUMENTS

| 2,824,599 | A | * | 2/1958 | Quinlan | 297/146 |
| 3,909,063 | A | * | 9/1975 | Bonisch et al. | 297/113 |
| 4,435,011 | A | * | 3/1984 | Hakamata | 297/113 |
| 4,662,674 | A | * | 5/1987 | Shirai et al. | 297/113 |
| 5,352,012 | A | * | 10/1994 | Chowdhury et al. | 297/113 |
| 5,752,739 | A | * | 5/1998 | Saeki | 297/113 |
| 6,059,238 | A | | 5/2000 | Reynolds et al. | |
| 6,328,384 | B1 | * | 12/2001 | Yamauchi et al. | 297/411.29 |
| 8,016,359 | B2 | * | 9/2011 | Dillinger et al. | 297/411.32 |

FOREIGN PATENT DOCUMENTS

| DE | 19811523 A1 | 9/1999 |
| DE | 10239382 A1 | 3/2004 |
| DE | 10327704 A1 | 1/2005 |
| DE | 202008009374 U1 | 10/2008 |
| FR | 2615460 A1 | 11/1988 |

OTHER PUBLICATIONS

French Search Report issued in FR 0951075 on Sep. 30, 2009.

* cited by examiner

*Primary Examiner* — Sarah B McPartlin

(74) *Attorney, Agent, or Firm* — Vedder Price PC

(57) ABSTRACT

A support for an armrest of a motor vehicle seat, formed of generally U-shaped solid plastic defining: a bottom intended to be attached to an armature of a backrest of the seat, and two parallel branches perpendicular to the bottom, each branch defining in a surface opposite to the other branch a hole intended to receive one end of an axis of the armrest and a groove intended to receive an armrest rotation stop element. An armrest armature, an armrest and its assembly method and a motor vehicle seat.

9 Claims, 3 Drawing Sheets

ARMREST SUPPORT FOR A MOTOR VEHICLE SEAT

BACKGROUND OF THE INVENTION

1. Field of the Invention

The present invention generally relates to automobile vehicle seats and, more specifically, to the fastening of a hinged armrest on a motor vehicle seat armature. The present invention more specifically relates to armrests integrated in a seat backrest, typically for the rear seat of a vehicle.

2. Discussion of the Related Art

To assemble an armrest on a seat armature, a U-shaped support, currently called a clevis, having a bottom attached to the armature of the seat backrest and two branches in parallel planes and perpendicular to the bottom, which support the armrest, is generally used. Each branch has an opening for receiving one end of at least a lateral hinge axis of the armrest.

Current devises are obtained by folding or stamping of a metal plate welded to the armature of the backrest. Pins or clamping rings are also required to assemble the axis of the armrest, which takes time during the assembly. Further, since the backrest and the armrest are upholstered before the assembly, there is a risk for them to be soiled or damaged in subsequent seat manufacturing steps.

Document DE-A-10327704 describes a method for assembling an armrest on a motor vehicle seat in which a second axis, parallel to the hinge axis of the armrest, cooperates with semi-circular grooves formed in the branches of a U-shaped clevis to be used as a limit stop during the raising or the lowering of the armrest. The clevis provided by this document is formed of a folded plate having its branches intended to receive the ends of the armrest axes. The assembly is performed by means of plastic locking elements. Such a structure remains expensive due to the use of three parts (the support and the two plastic snap elements).

A simplified and economical system for assembling a vehicle seat armrest is needed.

It would in particular be desirable to be able to assemble the armrest once the seat backrest has been upholstered.

SUMMARY OF THE INVENTION

An object of an embodiment of the present invention is to provide a hinged armrest fastening system for a motor vehicle seat which overcomes all or part of the disadvantages of conventional systems.

An object more specifically is to enable to assemble the armrest while the seat has already been upholstered.

Another object is to simplify the fastening of the support on the seat armature.

To achieve all or part of these objects as well as others, the present invention provides a support for an armrest of a motor vehicle seat, formed of generally U-shaped solid plastic defining:

a bottom intended to be attached to an armature of a backrest of the seat; and two parallel branches perpendicular to the bottom, each branch defining in a surface opposite to the other branch, a hole intended to receive one end of an axis of the armrest and a groove intended to receive an armrest rotation stop element.

According to an embodiment of the present invention, said surface comprises a portion of variable thickness from a peripheral opening of the branch and a peripheral opening of the hole, to define an inclined surface for the engaging of said end of the axis.

According to an embodiment of the present invention, said groove emerges on one edge of the branch, with a flared shape, an edge of the groove on the hole side defining a holding surface.

According to an embodiment of the present invention, one end of the groove, forming a stop for the armrest rotation, is located approximately between the hole and the bottom of the support.

According to an embodiment of the present invention, the bottom comprises, at its rear surface, at least one bearing, intended to cooperate with the armature of the backrest, and at least one opening for letting through a screw for fastening the support to the backrest armature.

The present invention also provides an armature of an armrest for a motor vehicle seat, comprising a bow having two free ends connected to angles for clamping the hinge axis.

According to an embodiment of the present invention, said stops are formed by the ends of a second axis, parallel to the hinge axis.

The present invention also provides a motor vehicle seat armrest, comprising:

an armature; and upholstery.

The present invention also provides a motor vehicle seat, comprising:

a seating part;

a backrest having an armature supporting at least one support; and at least one armrest.

The present invention also provides a method for assembling an armrest, on a backrest equipped with a support, wherein, after respective armatures of the backrest and of the armrest have been upholstered;

the rotation axis of the armrest is introduced by its respective ends from openings of the branches communicating with peripheral openings of the holes until it locks inside of the holes;

the respective stops of the armrest armature are introduced into the ends of access to the grooves emerging at the edge of each branch; and the armrest is pivoted downwards.

The foregoing objects, features, and advantages of the present invention will be discussed in detail in the following non-limiting description of specific embodiments in connection with the accompanying drawings.

DETAILED DESCRIPTION

Figure 1:
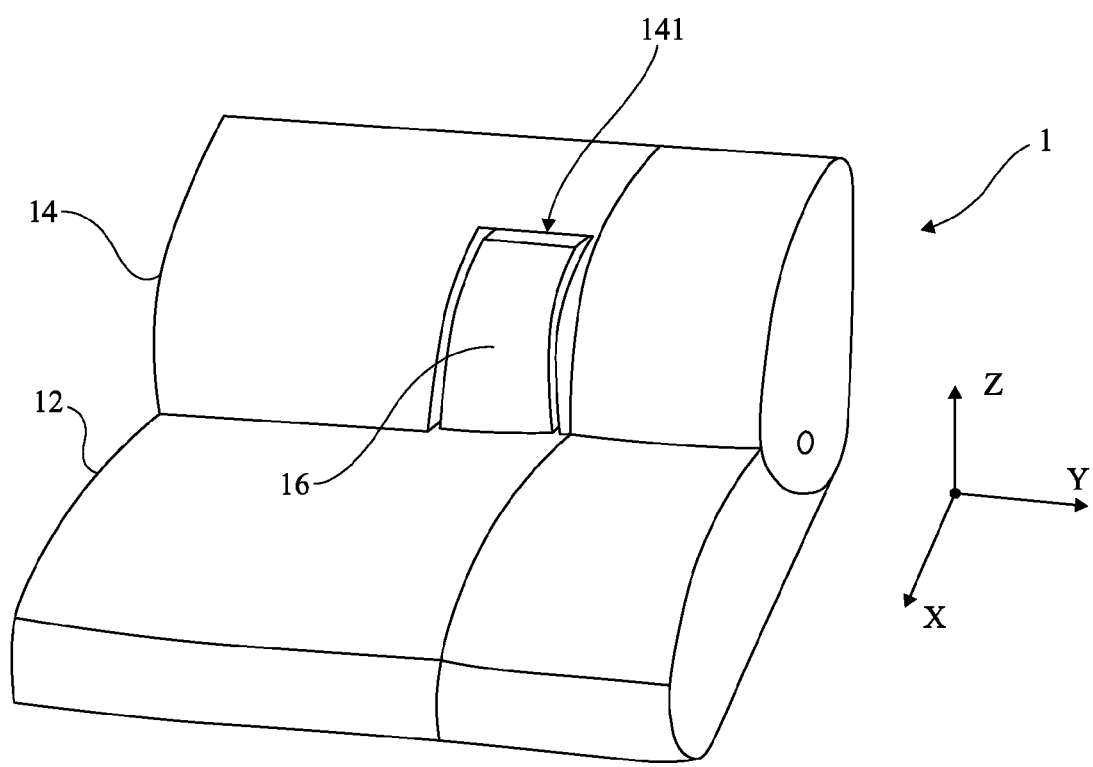
FIG. 1 is a perspective view of a back seat for a motor vehicle equipped with an armrest according to an embodiment of the present invention.

The same elements have been designated with the same reference numerals in the different drawings.

For clarity, only those elements which are useful to the understanding of the present invention have been shown and will be described. In particular, the forming of a seat armature has not been detailed, the present invention being compatible with usual armatures. Further, the elements for upholstering a seat and the armrest have not been shown, the present invention being here again compatible with usual upholsteries. Further, unless otherwise indicated, terms left, right, upper, lower, front, back, vertical, horizontal, etc. have been considered in the orientation of the drawings or in a position of use. To clarify these positions, oriented frames of reference (X, Y, Z), where X, Y, and Z respectively designate the front longitudinal, transverse, and vertical directions of the vehicle, have been symbolized in the drawings.

FIG. 1 is a perspective view of an example of a rear seat 1 for a motor vehicle. Seat 1 comprises a seating part 12 in one or several pieces (for example, in the case of a seat 1/3-2/3) on which a backrest 14, also in one or several portions, is hinged. Backrest 14 defines, for example in its middle, a housing 141 intended for an armrest 16 in raised position (shown in FIG. 1). Armrest 16 is hinged to backrest 14, to be able to be folded down towards the front in a position of use (not shown) where it is approximately horizontal.

The present invention will be described hereafter in relation with a motor vehicle rear seat armrest.

Figure 2:
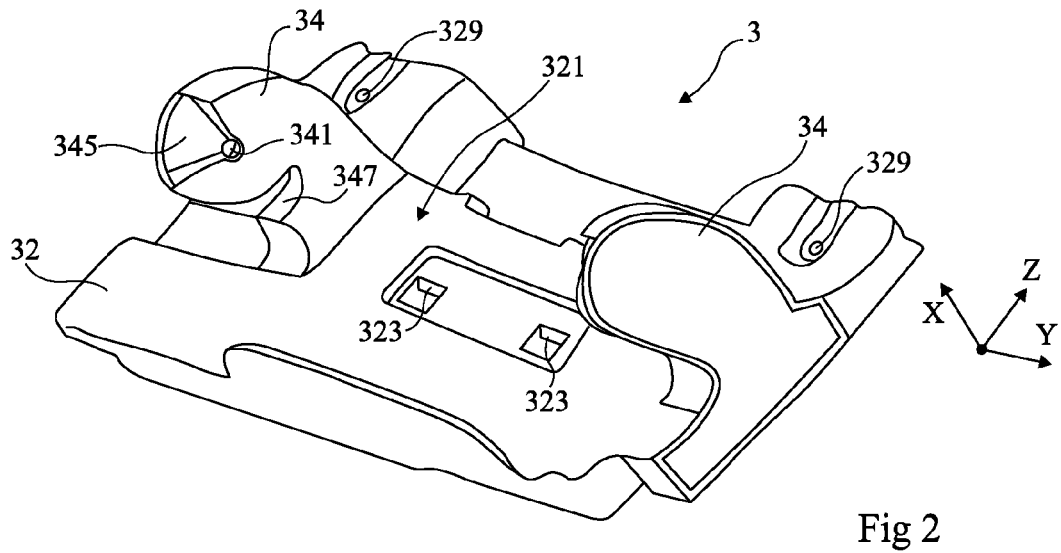
FIG. 2 is a perspective view of a backrest-to-armrest connection support according to an embodiment of the present invention.

FIG. 2 is a perspective view of an embodiment of a support 3 or clevis, intended to hinge an armrest 16 (FIG. 1) on a motor vehicle backrest 14.

Figure 3:
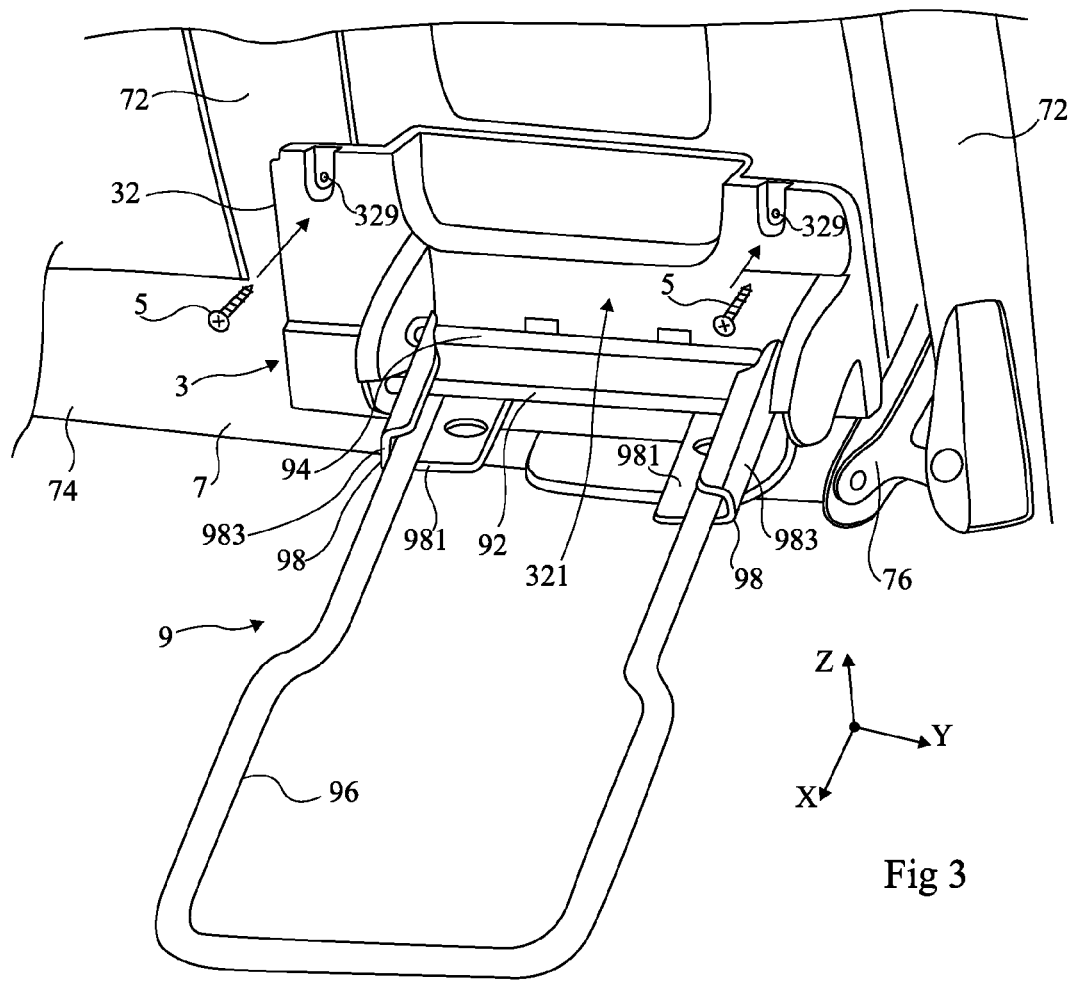
FIG. 3 is a partial perspective view of an armrest in situ on the support of FIG. 1.

FIG. 3 is a perspective view of support 3 of FIG. 2 assembled on an armature 7 of a backrest 14 of a seat 1. In FIG. 3, an armrest armature 9 has been shown as assembled on support 3 in a position of use.

It should be noted that the representation of FIG. 3 is simplified, armrest 16 being, in practice, mounted once upholstered on a backrest 14 which has itself been upholstered. However, to better show the armature elements cooperating together, the upholstery has not been shown.

As previously, support 3 (FIG. 2) has a general U shape with a bottom 32 intended to be attached to armature 7 (FIG. 3) of the seat backrest and having two parallel branches 34 or lugs perpendicular to bottom 32, intended to receive ends of a hinge axis 92 of armature 9 of armrest 16, and to guide elements 94 forming limit stops in a lowering of the armrest.

According to the present invention, support 3 is made of a solid plastic, obtained by molding. Bottom 32 defines, for example in a central portion 321, tabs 323 protruding towards the back. Tabs 323 are intended to rest on a flange, not visible in the drawings, of armature 7 of the backrest. They behave both as a support function and as means for positioning support 3. Once it has been installed, support 3 is fastened to armature 7, preferably by screwing (screw 5, FIG. 3) through openings 329 provided, for example, in the upper portion of bottom 32.

The assembly of support 3 is thus particularly simple: positioning by means of tabs 323 or other bearings, and locking by screwing. This assembly is performed on armature 7 of the backrest before it is upholstered. Armature 7 has been partially shown in FIG. 3. It usually comprises posts 72 and cross-members 74. The end posts (a single one of which is visible in FIG. 3) generally support, in their low portion, a hinge 76 intended to cooperate with the seating part (not shown in FIG. 3). The positions of tabs 323 and of holes 329 of support 3 are selected according to the shape of armature 7, preferably, so that the bearings bear on a cross-member 74 or an extension of a cross-member and that screws 5 engage in posts 72 or in a cross-member.

Figure 4:
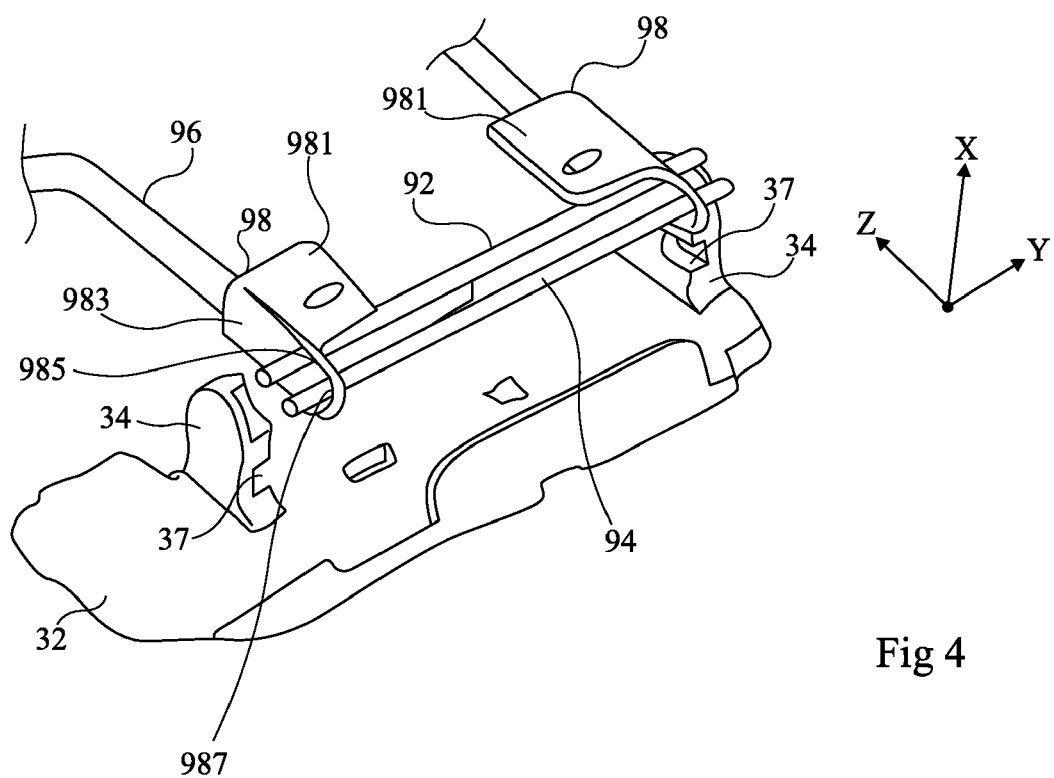
FIG. 4 is a perspective view illustrating the assembly of an armrest.

FIG. 4 is a partial perspective view illustrating the assembly of an armature 9 of an armrest 16 on support 3.

Armature 9 of armrest 16 is preferentially metallic and comprises an elongated portion 96 (for example, a U-shaped bow as shown in FIG. 3, or a plate), approximately horizontal in position of use and used to rigidify the armrest in its front portion and to support the upholstery. At the rear (on the side of support 3), armature 9 comprises two elements 98 of connection of bow 96 to lateral axis 92. For example, each element 98 is a metal clamping angle on a horizontal portion 981 of which rests and is welded a free end of bow 96 and which has a vertical portion 983 comprising a first opening 985, crossed by an end of axis 92. As illustrated in FIG. 3, each vertical portion 983 is for example folded towards the inside at its upper end to tightly encircle the corresponding end of bow 96. Still in the shown example, the rotation stops are formed by the ends of an axis 94 parallel to axis 92 and approximately located in the plane of bow 96, behind axis 92. Vertical portion 983 of each angle 98 then comprises a second opening 987 crossed by axis 94. As a variation, the stops are formed of pins, protruding from the external surfaces of vertical portions 983.

Figure 5:
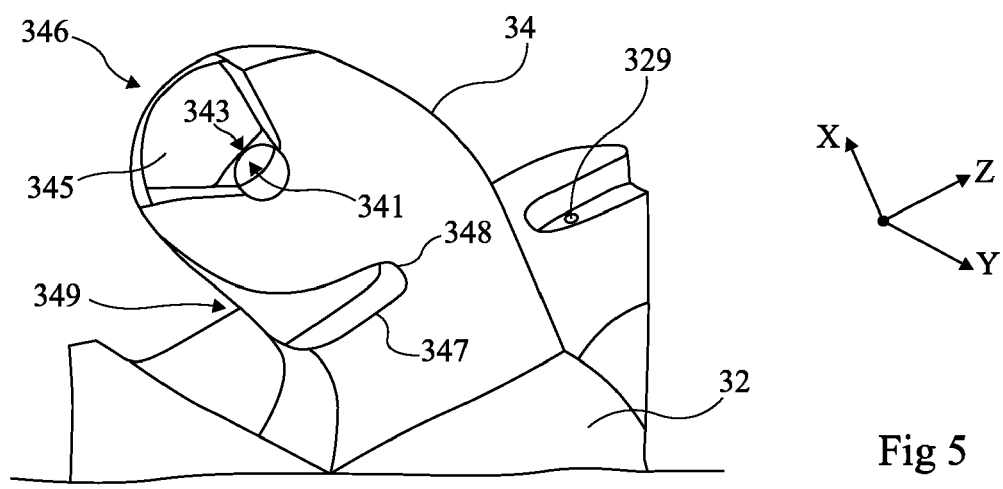
FIG. 5 is a partial view showing an enlargement of one of the branches of the support of FIG. 1.

FIG. 5 is an enlarged view of a detail of support 3 of FIG. 2 at the level of a branch 34.

Each branch 34 preferentially has a generally rounded shape, to avoid damaging the backrest upholstery, and comprises a horizontal hole 341, preferably blind, for receiving an end of axis 92. Each hole 341 is partially open (opening 343) at its periphery (for example, over approximately one quarter of its periphery and over from one quarter to half its depth), to enable to install axis 92. The internal surface of lug 34 defines, over an angle corresponding to the angle of opening 343 of hole 341, a portion 345 of variable thickness to help the introduction of the axis, the thickness of portion 345 increasing towards hole 341 until its internal surface joins opening 343. Portion 345 defines an inclined surface used to engage the end of axis 92. Thus, as the armrest is being installed (FIG. 4), axis 92 is engaged by force with a slight deformation of branches 34 until its ends are housed in holes 341. The armrest is then locked in its hinges. The inclined surface of portion 345 may have different slopes to favor the guiding.

The internal surface of each lug 34 also defines a groove 347 for receiving an end of axis 94. Groove 347 is open (opening 348) and has a downward flared cross-section (in position of use) to enable the introduction of the end of axis 94 and ease the subsequent rotation of the armrest. The upper portion of groove 347 is curved down to a bottom 348 which defines the limit stop of the armrest in lowered position. Bottom 348 is located between hole 341 and bottom 32 of support 3. In raised position, the limit stop is defined by the bottom of housing 141 (FIG. 1) made in the upholstering of backrest 14. It should be noted that in operation, axis 92 is locked in holes 341, thus preventing the disassembly of the armrest (unless lugs 32 are drawn apart from each other by force to release the ends of axis 92).

As illustrated in FIG. 4, to be assembled, the armrest is approximately vertically presented, and the ends of axis 92 are engaged in peripheral openings 346 of the access to holes 341, after which axis 92 is engaged into holes 341. As soon as the ends of axis 94 access to openings 349 defining ends of access to grooves 347 emerging on the edge of each branch, it is sufficient to lower the armrest to guarantee the engagement of axis 92 until it is locked in holes 341, due to the guiding of grooves 347. Once this locking has been achieved, the assembly is complete. The fitter does not need to visualize grooves 347 for the mounting. In practice, he engages axis 92 down to the bottom of holes 341 and pivots the armrest. Once the armrest has been installed, the surface of grooves 347 on the side of holes 341 (front surface in position of use) defines a holding surface which prevents any ejection towards the front of the armrest.

It is now possible to assemble the armrest without any tool. Further, this assembly is particularly simple. Further, the forming of the support in solid plastic simplifies its assembly on the backrest armature.

Various embodiments with different variations have been described hereabove. It should be noted that those skilled in the art may combine various elements of these various embodiments and variations without showing any inventive step. In particular, the shape of the armrest and its implantation in the seat may vary according to vehicles. Further, the forming of the support by plastic molding techniques current in the automobile field is within the abilities of those skilled in the art based on the functional and shape indications given hereabove, especially as to the selection of the plastic.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A support (3) for an armrest (16) of a motor vehicle seat (1), formed of generally U-shaped solid plastic defining:
   a bottom (32) intended to be attached to an armature (7) of a backrest (14) of the seat; and
   two parallel branches (34) perpendicular to the bottom, each branch defining in a surface opposite to the other branch a hole (341) intended to receive one end of an axis (92) of the armrest and a groove (347) intended to receive an armrest rotation stop element (94), said surface comprising a portion wherein a thickness of the portion increases towards the hole (345), to define an incline for engaging said end of the axis (92).

2. The support of claim 1, wherein said groove (347) emerges on one edge of the branch (34), with a flared shape, an edge of the groove on a side of said hole defining a holding surface.

3. The support of claim 2, wherein one end (348) of the groove (347), forming a stop for the rotation of the armrest (16), is located approximately between the hole (341) and the bottom (32) of the support.

4. The support of claim 1, wherein the bottom (32) comprises, at its rear surface, at least one bearing (323), intended to cooperate with the armature (7) of the seat backrest (14), and at least one opening (329) for letting through a screw (5) for fastening the support to the backrest armature.

5. An armrest (16) for a motor vehicle seat (1) comprising the support of claim 1 and a bow (96) having two free ends connected to angles (98) receiving hinge axis (92), said axis being received in said hole.

6. The armrest of claim 5, wherein stops are formed by ends of a second axis (94), parallel to said hinge axis (92).

7. The armrest of claim 5, further comprising upholstery.

8. A motor vehicle seat (1), comprising:
   a seating part (12);
   a backrest (14) having an armature (7) supporting at least one support (3) for an armrest; and
   at least one armrest of claim 7.

9. A method for assembling the seat of claim 8, wherein, after respective armatures (7, 9) of the backrest and of the armrest have been upholstered;
   the rotation axis (92) of the armrest is introduced by its respective ends from openings (346) of the branches (34) communicating with peripheral openings (343) of the holes (341) until it locks inside of the holes;
   stops (94) of the armrest armature formed by ends of a second axis (94) parallel to said hinge axis (92) are respectively introduced into ends (349) of access to said groove (347) emerging at the edge of each branch; and
   the armrest is pivoted downwards.

* * * * *